US011977510B2

(12) United States Patent
Singhal et al.

(10) Patent No.: US 11,977,510 B2
(45) Date of Patent: May 7, 2024

(54) CONFIGURING A FILE SERVER (71) Applicant: EMC IP Holding Company LLC, Hopkinton, MA (US)

(72) Inventors: Maneesh Singhal, Bangalore (IN); Adarsh Pradhan Jmt, Bangalore (IN); Jharanabala Nayak, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 611 days.

(21) Appl. No.: 16/925,678

(22) Filed: Jul. 10, 2020

(65) Prior Publication Data
US 2022/0012208 A1    Jan. 13, 2022

(51) Int. Cl.
*G06F 16/00* (2019.01)
*G06F 9/455* (2018.01)
*G06F 9/50* (2006.01)
*G06F 11/20* (2006.01)
*G06F 16/11* (2019.01)

(52) U.S. Cl.
CPC .......... *G06F 16/11* (2019.01); *G06F 9/45558* (2013.01); *G06F 9/5077* (2013.01); *G06F 11/2069* (2013.01); *G06F 2009/45579* (2013.01); *G06F 2009/45595* (2013.01); *G06F 2209/505* (2013.01)

(58) Field of Classification Search
CPC .... G06F 16/11; G06F 9/45558; G06F 9/5077; G06F 11/2069; G06F 2009/45579; G06F 2009/45595; G06F 2209/505; G06F 11/2064

USPC .................................................. 707/600–899
See application file for complete search history.

(56) References Cited

U.S. PATENT DOCUMENTS

| 2008/0031238 | A1* | 2/2008 | Harmelin | H04L 41/0843 370/389 |
| 2009/0254649 | A1* | 10/2009 | Coffey | H04L 61/5046 709/224 |
| 2015/0186228 | A1* | 7/2015 | Kumar | G06F 11/2028 714/4.12 |
| 2015/0373115 | A1* | 12/2015 | Breakstone | G06F 11/2069 709/217 |

\* cited by examiner

Primary Examiner — Michelle N Owyang
Assistant Examiner — Shirley D Hicks
(74) Attorney, Agent, or Firm — Muirhead and Saturnelli, LLC (57) ABSTRACT For processing nodes of a cluster of a file server, the IO modules associated with the nodes may be required to be part of a same sub-network. A cluster may be configured to ensure that, for each cluster processing node, at least one other cluster processing node is associated with an IO module on a same sub-network as the IO module associated with the cluster processing node. The user may configure a file server to ensure that a primary node and one or more failover nodes of the file server are on a same sub-network. When configuring IO modules, physical ports having similar or same characteristics may be configured to be on a same sub-network. By doing so, and restricting nodes of a file server to being on a same sub-network, a relatively seamless failover between nodes of a file server may be achieved.

14 Claims, 6 Drawing Sheets

CONFIGURING A FILE SERVER

BACKGROUND

Technical Field

This application generally relates to data storage systems, and more particularly to configuring a file server on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (IO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method of configuring an application on a storage system is performed. The method includes associating a plurality of IO modules of the storage system with a cluster of processing nodes, defining a network address for each IO module, each network address belonging to a first sub-network, and associating a plurality of the processing nodes of the cluster with the application, which includes restricting the plurality of the processing nodes to processing nodes associated with IO modules having an network address on the first sub-network. Associating the plurality of the processing nodes may include a user selecting a first of the plurality of processing nodes as a primary node of the file system and determining one or more of the other processing nodes of the cluster that are eligible to serve as failover nodes for the first processing node. The method further may include displaying the one or more of the other processing nodes of the cluster that are eligible to serve as failover nodes for the first processing node. The one or more other processing nodes that are eligible may be processing nodes associated with IO modules having a network address belonging to the first sub-network. The method further may include verifying that each of the plurality of IO modules associated with the cluster share a sub-network with at least one other of the plurality of IO modules of the cluster. The method further may include notifying a user when at least one of the plurality of IO modules associated with the cluster does not share a sub-network with at least one other of the plurality of IO modules of the cluster. The plurality of nodes may include a primary node and one or more failover nodes. The processing nodes may be virtual machines, and the application may be a file server.

In another embodiment of the invention, a storage system is provided. The storage system includes a cluster of processing nodes, and executable logic that implements a method of configuring an application on the storage system, including associating a plurality of IO modules of the storage system with a cluster of processing nodes, defining a network address for each IO module, each network address belonging to a first sub-network, and associating a plurality of the processing nodes of the cluster with the application, which includes restricting the plurality of the processing nodes to processing nodes associated with IO modules having an network address on the first sub-network. Associating the plurality of the processing nodes may include a user selecting a first of the plurality of processing nodes as a primary node of the file system, and determining one or more of the other processing nodes of the cluster that are eligible to serve as failover nodes for the first processing node. The method may further may include displaying the one or more of the other processing nodes of the cluster that are eligible to serve as failover nodes for the first processing node. The one or more other processing nodes that are eligible may be processing nodes associated with IO modules having a network address belonging to the first sub-network. The method further may include verifying that each of the plurality of IO modules associated with the cluster share a sub-network with at least one other of the plurality of IO modules of the cluster. The method further may include notifying a user when at least one of the plurality of IO modules associated with the cluster does not share a sub-network with at least one other of the plurality of IO modules of the cluster. The plurality of nodes may include a primary node and one or more failover nodes. The processing nodes may be virtual machines, and the application may be a file server.

In another embodiment of the invention, computer-readable media, for example, non-transitory computer-readable media, are provided, the computer-readable media having software stored thereon including executable code that performs the above-described method of configuring an application on a storage system. The method includes executable code that associates a plurality of IO modules of the storage system with a cluster of processing nodes, executable code that defines a network address for each IO module, each network address belonging to a first sub-network, and associating a plurality of the processing nodes of the cluster with the application, which includes restricting the plurality of the processing nodes to processing nodes associated with IO modules having an network address on the first sub-network. The executable code that associates the plurality of the processing nodes may include executable code that enables a user to select a first of the plurality of processing nodes as a primary node of the file system, and executable code that determines one or more of the other processing nodes of the cluster that are eligible to serve as failover nodes for the first processing node. The method further may include any of the steps of the above-described method of configuring an application on a storage system.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Some storage systems provide file-level services to host systems, for example, by providing one or more file-level (as opposed to block-level) servers over a network. Such servers include network-attached storage (NAS) servers, for example, Dell EMC™ Unity™ storage systems made available by EMC Corporation ("Dell EMC") of Hopkinton, MA. In some cases, a storage system may provide file servers (e.g., NAS servers) in addition to block-level services. For example, a PowerMax™ storage systems made available from EMC Corporation ("Dell EMC") provides block-level storage services and may provide a virtualized platform on which one or more file servers may be implemented, for example, one or more embedded NAS (eNAS) servers.

Some storage systems may provide one or more distributed file servers that are distributed across multiple separate logical and/or physical components of the storage system. For example, a file server may be distributed among multiple processing nodes of a cluster, where one or more of the processing nodes of the cluster may reside on separate, physically discrete components of the storage system, which may be desirable for fault tolerance and high availability (HA) in the event of a failure of one of the physically discrete components. In such systems, nodes may be configured to serve as failover nodes for other nodes of a same cluster. The separate, physically discrete components of the storage system described above may be referred to herein as "storage processing modules."

When configuring a distributed file server on one or more processing nodes of a cluster, for each instance of a file server, it may be required to designate a primary node of a cluster and one or more failover nodes to serve in place of the primary node in the event of a failure of a primary node. For some such distributed file servers, a relatively easy way to ensure that a failover is as seamless as possible is to require that the primary node and the failover nodes are homogenous, i.e., configured in the same way, which may include configuring the hardware resources of each node the same way, where such hardware resources may include CPUs, memory, front-end (FE) slots and IO modules. An FE slot is a physical component of a storage system, configured to physically receive an IO module that couples the storage system (typically through a network) to a host system. An IO module may include a network interface card (NIC), for example, a small-level interface card (SLIC), that includes one or more physical ports that can be physically coupled to a physical link (e.g., electric or fiber optic cable) that connects, for example, to a switch of network between one or more host systems and the storage system.

For HA, it may be desirable to have a primary node of a distributed file server on a different storage processing module than the one or more failover nodes of the distributed file server. In such embodiments, the homogeneity of file system nodes, more particularly, the homogeneity of IO modules of such nodes, may include configuring each node such that, for all nodes of the cluster: 1) the same slot (relative to the respective storage processing module; i.e., "slot 1") is used by the IO module; 2) the type of IO module (e.g., Ethernet vs. Fibre Channel (FC)) is the same; and 3) the number of physical ports included in the IO module is the same.

In such embodiments in which a primary node of a distributed file server is on a different storage processing module than the one or more failover nodes of the distributed file server, it may prove relatively easy to ensure that CPU and memory resources of the primary and failover nodes of the distributed file server are configured the same, as the overall CPU and memory resources on each storage processing module may be the same and remain static, e.g., as manufactured. Further, in virtualized environments (described in more detail elsewhere herein), it may be even easier to configure (e.g., using software) the CPU and memory resources allocated to each node of the file server to be the same. However, it can be more difficult to ensure homogeneity of IO modules between the nodes as described above, as different types of IO modules having different numbers of physical ports may be inserted in different slots of storage processing modules over time. That is, the IO modules of a storage processing module are not necessarily static, but may change over time. Further, in virtualized environments, the virtualization or hardware resources may not include virtualization of IO module resources, further hampering the ability to maintain homogeneity of IO module resources between nodes of a file server.

Given the difficulty in maintaining homogeneity of IO modules between nodes of a distributed file system, it may be desirable to remove such homogeneity requirement, while still providing a way to configure nodes of a file server to provide a relatively seamless failover between such nodes.

Described herein are techniques and mechanisms for configuring an application, for example, a file server, on a storage system. While embodiments of the invention are described in relation to configuring a file server on a storage system, it should be appreciated that the invention is not so limited, as other types of applications may be configured according to the techniques and mechanisms described herein, and applications may be configured on other types of systems other than a storage system (e.g., a host system or end user device) according to the techniques and mechanisms described herein.

In some embodiments of the invention, rather than maintaining homogeneity between hardware resources of processing nodes of a cluster, homogeneity may be maintained with respect to network connectivity of the processing nodes of the cluster. For example, for the two or more processing nodes of a cluster of a file server, the IO modules associated with the nodes may be required to be part of a same logical area of a network, e.g., a sub-network of the network. For example, the IO modules of the processing nodes may be restricted to belonging to the same sub-network of a network, e.g., an Internet Protocol (IP) network. For example, for an IP network for which an IP address is defined by 32 bits represented as "A.B.C.D," where each of A, B, C and D are an integer in the range of 0-255, an IP sub-network ("IP subnet") may be defined by the first three integers A.B.C of the IP address, in which case the IP addresses of each device on the IP subnet may have the same value for A, B and C, and a unique value for D.

In some embodiments, a user interface may be provided that assists a user in configuring a cluster to ensure that, for each processing node of the cluster, at least one other processing node of the cluster is associated with an IO module on a same sub-network as the IO module associated with the processing node. The user interface may further assist the user in configuring a file server to ensure that a primary node and one or more failover nodes of the file server are on a same sub-network.

In some embodiments, when configuring IO modules (e.g., prior to configuring a cluster or file server on the cluster), physical ports (of SLICs) having similar or same characteristics (e.g., network type—Ethernet or FC), bandwidth threshold, etc.) may be configured to be on a same sub-network, e.g., a same IP subnet. By doing so, and restricting nodes of a file server to being on a same sub-network, a relatively seamless failover between nodes of a file server may be achieved without the burden of imposing hardware homogeneity between such nodes.

In some embodiments of the invention, one or more of the processing nodes are implemented as virtual machines (VMs) in accordance with virtualization technology, as described in more detail elsewhere herein.

Illustrative embodiments of the invention will now be described in more detail in relation to the figures.

Figure 1:
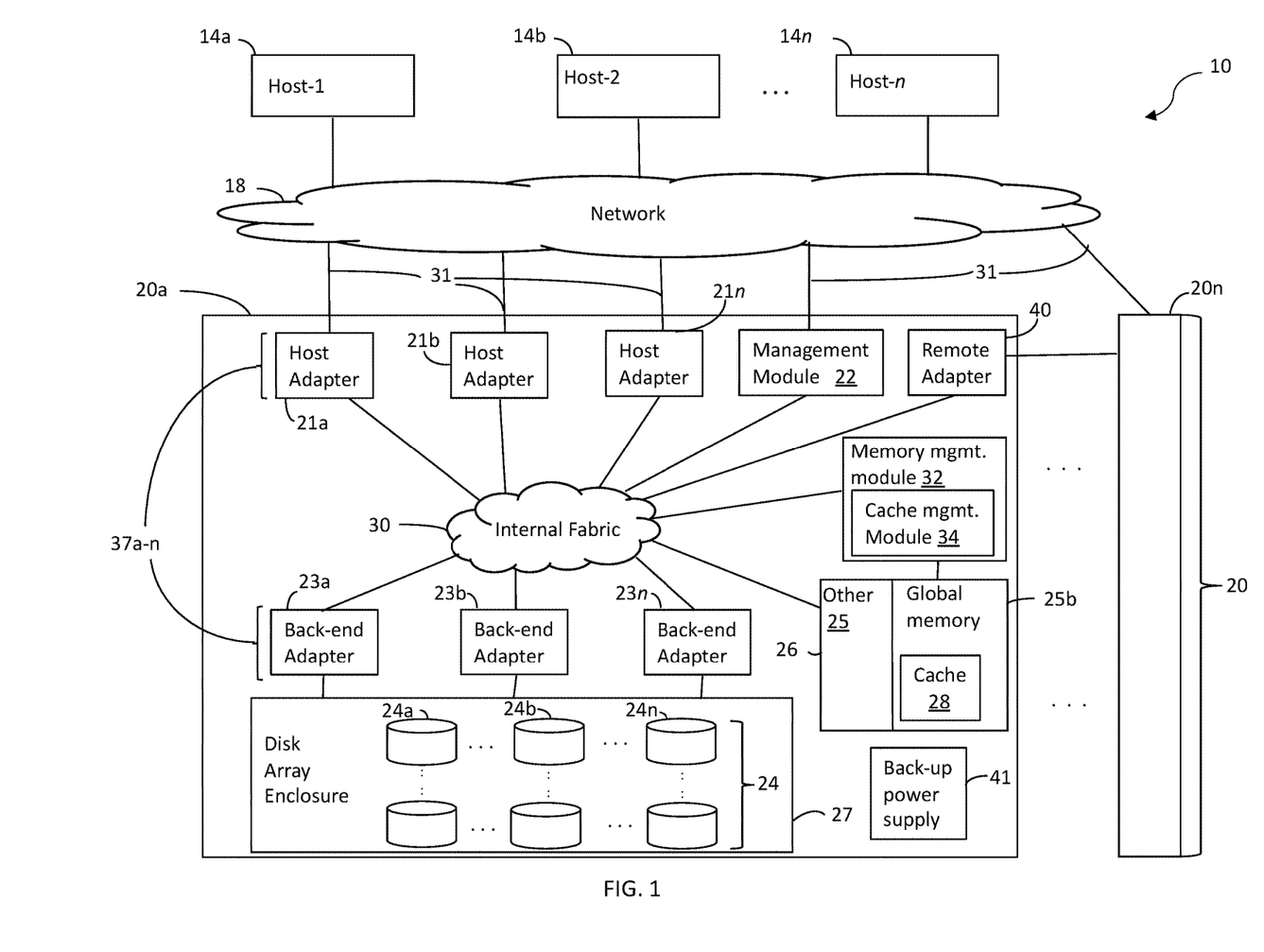
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the physical storage devices 24 may be grouped or arranged together, for example, in an arrangement consisting of N rows of physical storage devices 24a-n. In some embodiments, one or more physical storage devices (e.g., one of the rows 24a-n of physical storage devices) may be connected to a back-end adapter ("BE") (e.g., a director configured to serve as a BE) responsible for the backend management of operations to and from a portion of the physical storage devices 24. A BE is sometimes referred to by those in the art as a disk adapter ("DA") because of the development of such adapters during a period in which disks were the dominant type of physical storage device used in storage systems, even though such so-called DAs may be configured to manage other types of physical storage devices (e.g., SSDs). In the system 20a, a single BE, such as 23a, may be responsible for the management of one or more (e.g., a row) of physical storage devices, such as row 24a. That is, in some configurations, all IO communications with one or more physical storage devices 24 may be controlled by a specific BE. BEs 23a-n may employ one or more technologies in communicating with, and transferring data to/from, physical storage devices 24, for example, SAS, SATA or NVMe. For NVMe, to enable communication between each BE and the physical storage devices that it controls, the storage system may include a PCIe switch for each physical storage device controlled by the BE; i.e., connecting the physical storage device to the controlling BE.

It should be appreciated that the physical storage devices are not limited to being arranged in rows. Further, the DAE 27 is not limited to enclosing disks, as the name may suggest, but may be constructed and arranged to enclose a plurality of any type of physical storage device, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and GM 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of physical storage devices 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (TB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more physical storage devices 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined physical storage devices, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a physical storage device. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
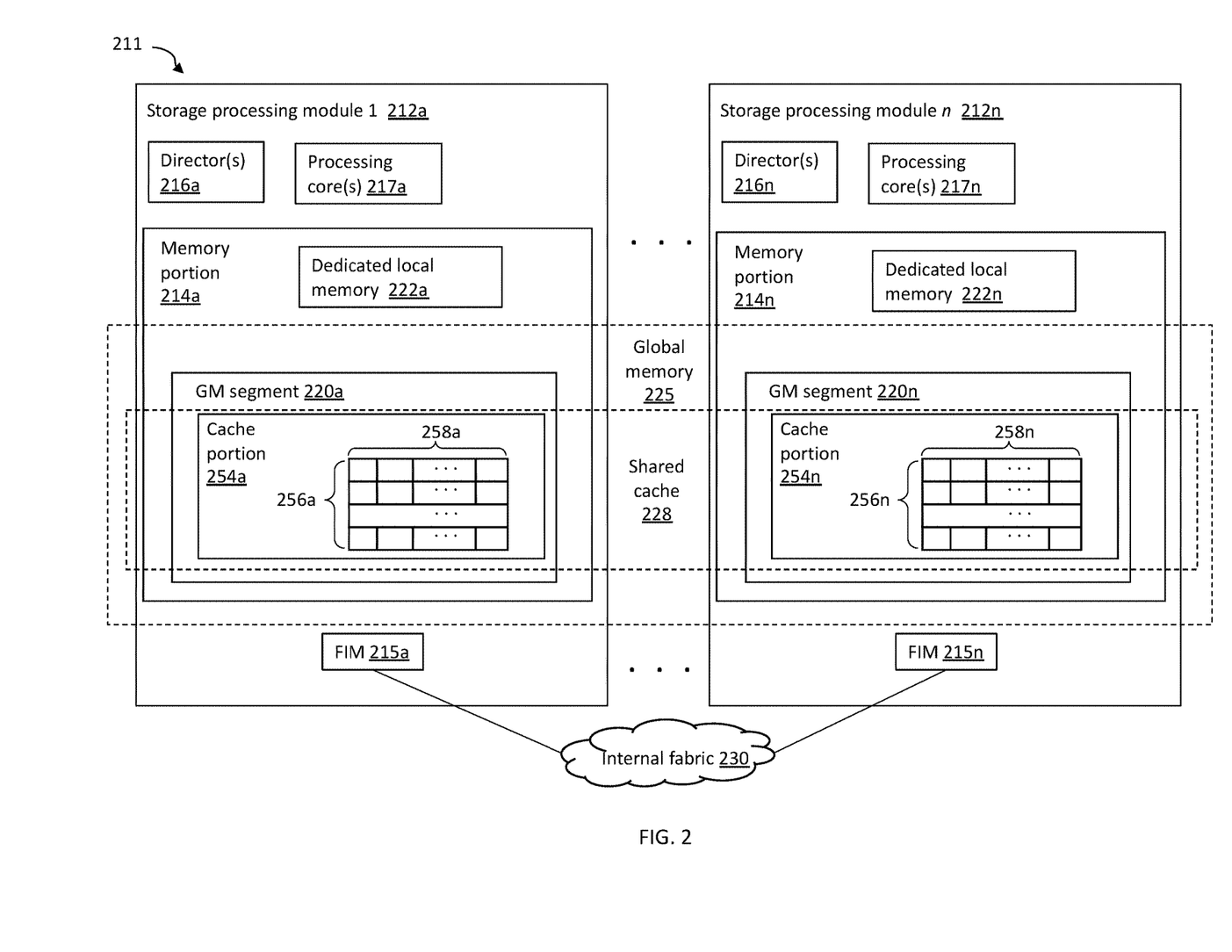
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VMAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the physical storage devices (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., physical storage devices) into many LUNs, each with its own addressable space defined in logical blocks addresses (LBAs). The LSUs may or may not correspond to the actual physical storage devices. For example, one or more LSUs may map to a single physical storage device; that is, the logical address space of the one or more LSU may map to physical space on a single physical storage device. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated physical storage device(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "storage processing modules." Storage system 211 may include a plurality of storage processing modules 212a-212n and a fabric 230 (e.g., internal fabric 30) over which the storage processing modules 212a-n may communicate. Each of the storage processing modules 212a-212n may include components thereon as illustrated. The fabric 230 may include, for example, one or more switches and connections between the switch(es) and storage processing modules 212a-212n. In at least one embodiment, the fabric 230 may be an IB fabric. In some embodiments, multiple processing 212a-n nodes may be implemented on a single physically discrete component; e.g., two storage processing modules 212a-n may be implemented on single engine of PowerMax storage system.

In the following paragraphs, further details are described with reference to storage processing module 212a but each of the N storage processing modules in a system may be similarly configured. For example, storage processing module 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the storage processing module 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217*a*. Such software implementation of directors may be considered emulations of types of physical directors (i.e., directors implemented (at least primarily) in hardware).

Each FIM 215*a-n* may include one or more host channel adapters (HCAs) that physically couple, and are configured to enable communication between, its respective storage processing module 212*a-n*, and the internal fabric 230. In some embodiments, the internal fabric 230 may include multiple (e.g., 2) switches, and each HCA 215*a-n* may have multiple (e.g., 2) ports, each one connected directly to one of the switches.

Each of the storage processing modules 212*a-n* may, respectively, also include memory portions 214*a-n*. The memory portion of each storage processing module may be characterized as locally accessible with respect to that particular storage processing module, and more specifically with respect to other components on the same storage processing module. For example, storage processing module 212*a* includes memory portion 214*a* which is memory that is local to that particular storage processing module 212*a*. Data stored in memory portion 214*a* may be directly accessed by any of the processing cores 217*a* (e.g., executing instructions on behalf of one of the directors 216*a*) of the storage processing module 212*a*. For example, memory portion 214*a* may be a fast memory (e.g., DIMM (dual inline memory module) DRAM (dynamic random access memory)) that is locally accessible by a director 216*a*, where data from one location in 214*a* may be copied to another location in 214*a* directly using DMA operations (e.g., local memory copy operations) issued by director 216*a*. Thus, the director 216*a* may directly access data of 214*a* locally without communicating over the fabric 230.

The memory portions 214*a-*214*n* of storage processing modules 212*a-n* may be further partitioned into different portions or segments for different uses. For example, each of the memory portions 214*a-*214*n* may respectively include GM segments 220*a-n* configured for collective use as segments of a distributed GM, for example, GM 225 (e.g., GM 25*b*). Thus, data stored in any GM segment 220*a-n* may be accessed by any director 216*a-n* on any storage processing module 212*a-n*. Additionally, each of the memory portions 214*a-n* may respectively include dedicated local memories 222*a-n*. Each of the dedicated local memories 222*a-n* are respectively configured for use locally by the one or more directors 216*a-n*, and possibly other components, residing on the same single storage processing module. In at least one embodiment where there is a single director denoted by 216*a* (and generally by each of 216*a-n*), data stored in the dedicated local memory 222*a* may be accessed by the respective single director 216*a* located on the same storage processing module 212*a*. However, the remaining directors located on other ones of the N storage processing modules may not access data stored in the dedicated local memory 222*a*.

To further illustrate, GM segment 220*a* may include information such as user data stored in the cache portion 220*a*, metadata, and the like, that is accessed (e.g., for read and/or write) generally by any director of any of the storage processing modules 212*a-n*. Thus, for example, any director 216*a-n* of any of the storage processing modules 212*a-n* may communicate over the fabric 230 to access data in GM segment 220*a*. In a similar manner, any director 216*a-n* of any of the storage processing modules 212*a-n* may generally communicate over fabric 230 to access any GM segment 220*a-n* of the distributed GM. Although a particular GM segment, such as 220*a*, may be locally accessible to directors on one particular storage processing module, such as 212*a*, any director of any of the storage processing modules 212*a-n* may generally access the GM segment 220*a*. Additionally, the director 216*a* also may use the fabric 230 for data transfers to and/or from GM segment 220*a* even though 220*a* is locally accessible to director 216*a* (without having to use the fabric 230).

Also, to further illustrate, dedicated local memory 222*a* may be a segment of the memory portion 214*a* on storage processing module 212*a* configured for local use solely by components on the single/same storage processing module 212*a*. For example, dedicated local memory 222*a* may include data described in following paragraphs which is used and accessed only by directors 216*a* included on the same storage processing module 212*a* as the dedicated local memory 222*a*. In at least one embodiment in accordance with techniques herein and as described elsewhere herein, each of the dedicated local memories 222*a-n* may include a local page table or page directory used, respectively, by only director(s) 216*a-n* local to each of the storage processing modules 212*a-n*.

In such an embodiment as in FIG. 2, the GM segments 220*a-n* may be logically concatenated or viewed in the aggregate as forming one contiguous GM logical address space of a distributed GM. In at least one embodiment, the distributed GM formed by GM segments 220*a-n* may include the cache portion 254*a*, various metadata and/or structures, and other information, as described in more detail elsewhere herein. Consistent with discussion herein, the cache portion 254*a*, having cache slots allocated from GM segments 220*a-n*, may be used to store IO data (e.g., for servicing read and write operations).

Each cache portion 254*a-n* may be a portion of a shared cache 228 (e.g., cache 28) distributed across the storage processing modules 212*a-n*, where the shared cache 228 may be considered a part of the GM 225. The cache portion 254*a-n* may include a plurality of cache slots 256*a-n*, each cache slot including one or more (e.g., 16) sections 258*a-n*. Each cache slot 256*a-n* may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more physical storage devices. Additionally, the host also may have one or more additional mapping layers so that, for example, a host-side LSU may be mapped to one or more storage system LSUs as presented to the host.

Any of a variety of data structures may be used to process IO on storage system 20*a*, including data structures to manage the mapping of LSUs and locations thereon to physical storage devices and locations thereon. Such data structures may be stored in any of memory 26, including GM 25*b* and memory 25*a*, GM segment 220*a-n* and/or dedicated local memories 22*a-n*. Thus, storage system 20*a*, and storage system 620*a* described in more detail elsewhere herein, may include memory elements (e.g., cache) that hold data stored on physical storage devices or that is currently held ("staged") and will be stored ("de-staged") to physical storage devices, and memory elements that store metadata (e.g., any of the metadata described herein) associated with such data. Illustrative examples of data structures for holding such metadata will now be described.

Figure 3:
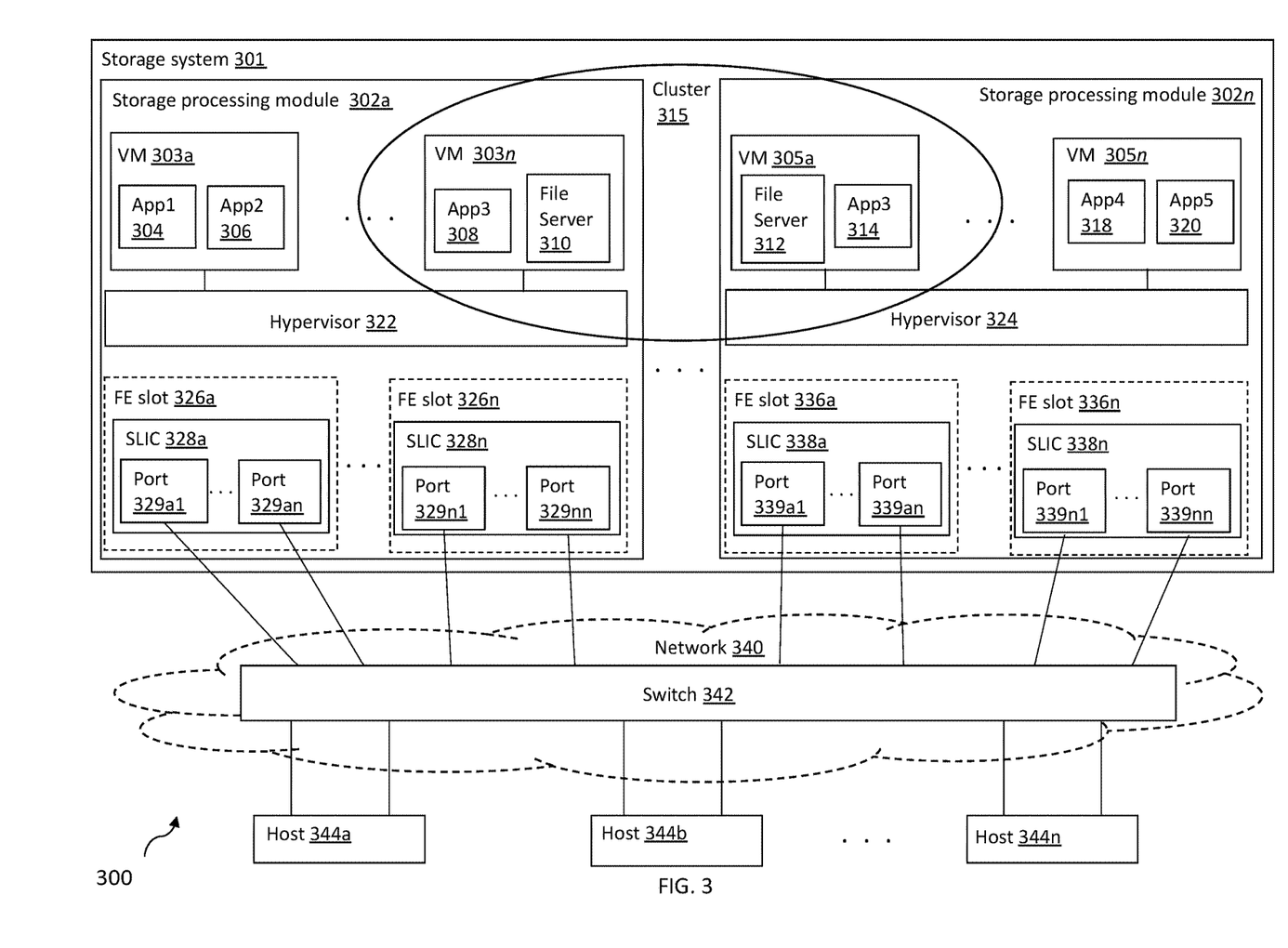
FIG. 3 is a block diagram illustrating an example of a system for configuring a file server, according to embodiments of the invention.

In some embodiments of the invention, it may be desirable to configure a file server on a storage system. FIG. 3 is a block diagram illustrating an example of a system 300 for configuring a file server, according to embodiments of the invention. Other embodiments of a system for configuring a file server, for example, variations of system 300, are possible and are intended to fall within the scope of the invention. The system 300 may be part of a storage network, for example, the storage network 10 or a variation thereof.

The system 300 may include any of: a storage system 301; network 340; host systems 344a-n, other components; or any suitable combination thereof. The storage system 301 may be storage system 20a or a variation thereof, and may include storage processing modules 302a-n (e.g., 212a-n). In some embodiments, the storage system 301 may be a PowerMax storage system and storage processing nodes 302a-n may be director boards. The storage processing module 302a may include one or more front-end (FE) slots 326a-n, in which SLICs 328a-n, respectively, may be installed. Each of the SLICs may include one or more ports (i.e., FE ports) that serve to couple the storage system 301 through the switch 342 of the network 340 to one or more host systems 344a-n. For example, the SLIC 328a may include FE ports 329a1-an, and the SLIC 328n may include FE ports 329n1-nn.

The storage processing module 302n may include one or more front-end (FE) slots 336a-n, in which SLICs 338a-n, respectively, may be installed. Each of the SLICs may include one or more ports (i.e., FE ports) that serve to couple the storage system 301 through the switch 342 of the network 340 to one or more host systems 344a-n. For example, the SLIC 338a may include FE ports 339a1-an, and the SLIC 338n may include FE ports 339n1-nn.

Each of the storage processing modules may include a plurality of processing nodes, which may be implemented using software, firmware, or a suitable combination thereof. In some embodiments, the processing nodes may be implemented as VMs using virtualization software. For example, the storage processing module 302a may include VMs 303a-n running (e.g., executing as threads) on hypervisor 322; and the storage processing node 302n may include VMs 305a-n running (e.g., executing as threads) on hypervisor 324. In some embodiments, the VMs 303a-n and/or VMs 305a-n may be guest operating systems (OSs) running on a storage hypervisor provided by a Hypermax™ OS of a PowerMax storage system.

One or more applications may run within each VM. For example, App1 304 and App2 306 may run within VM 303a, App3 308 and file server 310 may run within the VM 303n, file server 312 and App3 314 may run within the VM 305a, and App4 318 and App5 320 may run within VM 305n. In some embodiments, an application may be a distributed application running within multiple VMs of a cluster executing on one or more storage processing modules. For example, the file server 310 and the file server 312 may be instances of a same distributed file system running within cluster 315. As will be described in more detail elsewhere herein, an IO module (e.g., one of the SLICs 328a-n and/or SLICs 338a-n) may be associated with each VM.

Figure 4:
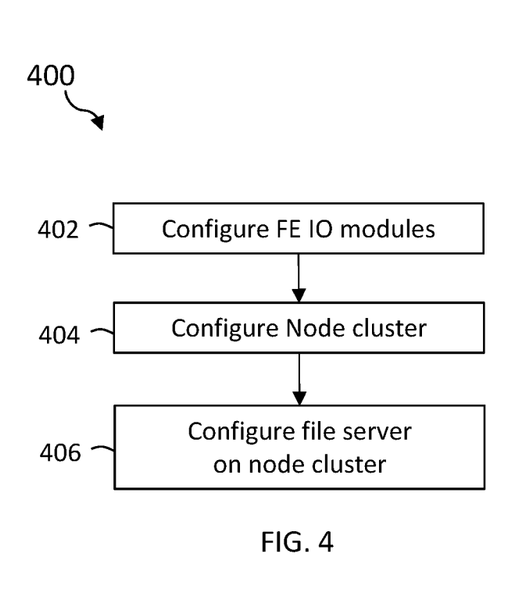
FIG. 4 is a flowchart illustrating an example of a method of configuring a file server, according to embodiments of the invention.

FIG. 4 is a flowchart illustrating an example of a method 400 of configuring a file server, according to embodiments of the invention. Other embodiments of a method of configuring a file server, for example, variations of the method 400, are possible and are intended to fall within the scope of the invention.

In a step 402, one or more FE IO modules of a storage system may be configured. In some embodiments, when configuring FE IO modules (e.g., prior to configuring a cluster or file server on the cluster), physical ports (of SLICs) having similar or same characteristics (e.g., network type—Ethernet or FC), bandwidth threshold, etc.) may be configured to be on a same sub-network, e.g., a same IP subnet. In some embodiments of the invention, each physical port of an IO module may be required to be on a same sub-network such that a single sub-network is identified with each IO module. That is, in some embodiments, the step 402 includes configuring each physical port of an IO module to be on a same sub-network. To this end, embodiments are described herein as having a single sub-network associated with an IO module, but it should be appreciated that the invention is not so limited, as in some embodiments different ports of an IO module may be configured to belong to different sub-networks. By configuring IO modules having similar or same characteristics to have network addresses (e.g., IP addresses) on a same sub-network, sub-networks may be used to impose a network homogeneity for nodes of a cluster (and applications running within the nodes), which may result in a relatively seamless failover between nodes of a file server. For example, as described in more detail elsewhere herein, nodes of a file server may be required to be on a same sub-network.

Figure 5:
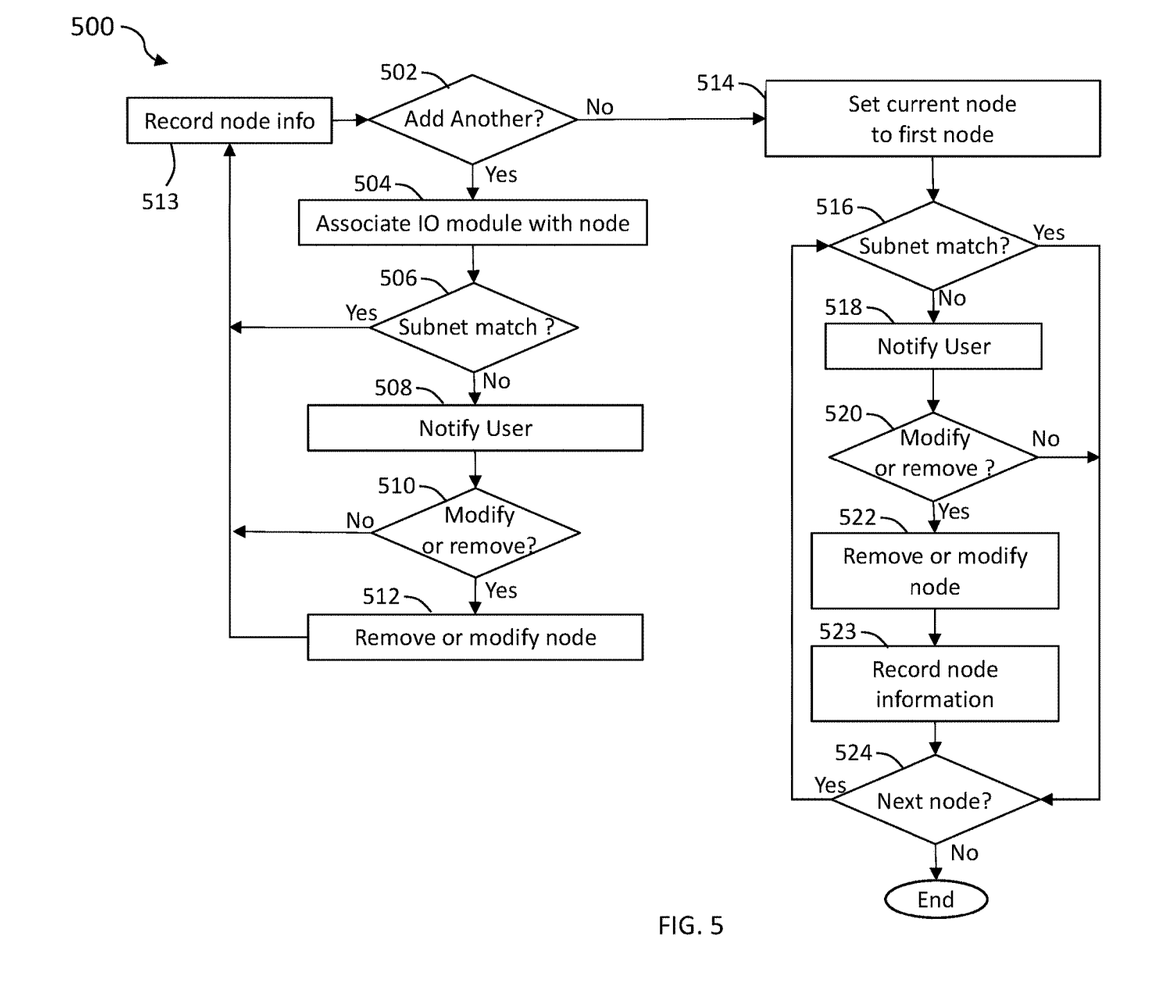
FIG. 5 is a flowchart illustrating an example of a method of configuring a node cluster, according to embodiments of the invention.
Figure 6:
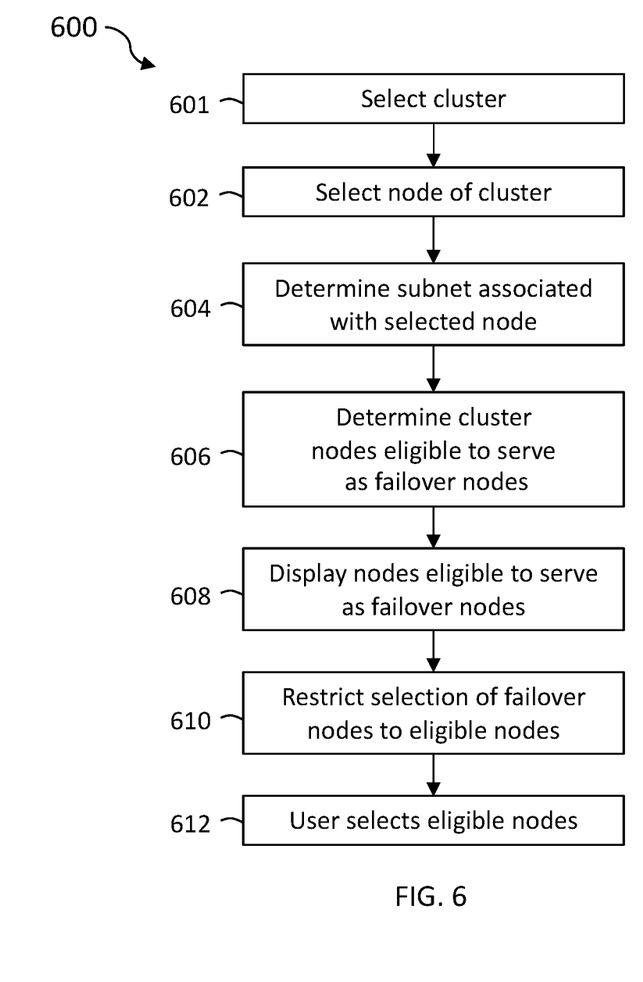
FIG. 6 is a flowchart illustrating an example of a method of managing configuration of a file server, according to embodiments of the invention.

In a step 404, a node cluster may be configured, for example, as described in relation to FIG. 5; and in a step 406, a file server may be configured on a node cluster, for example, as described in relation to FIG. 6.

FIG. 5 is a flowchart illustrating an example of a method 500 of configuring a node cluster, according to embodiments of the invention. Other embodiments of a method of configuring a node cluster, for example, variations of method 500, are possible and are intended to fall within the scope of the invention.

In a step 502, it may be determined whether a user wants to add another node to the cluster. For example, a user interface may present to the user the option of adding another node to the cluster, and enable the user to select whether to do so. Any of variety of other information may be displayed, including, for example, information about the existing nodes of the cluster, the IO module associated with each node, and, for each IO module, the slot in which the IO module resides, the type of IO module, the number of physical ports and the network addresses and/or subnets of the physical ports of the IO module.

In some embodiments, it may be required that a set number of minimum number of nodes (e.g., 3) be created for a cluster, in which case the method may include the additional step (not shown) of determining whether there is at least the set of minimum number of nodes, e.g., before allowing the user the choice of whether to add another node in the step 502.

If the user elects to add another node, then creation of the node may begin, including associating an IO module with the node in a step 504. Associating the IO module may include selecting an IO module from a list of IO modules displayed on the user interface, including any of the information for each IO module described above.

In step 506, it may be determined whether there is a subnet match between the added IO module and any other IO module associated with a node of the cluster. In some embodiments, it may be required that there be a set number of minimum number of nodes (e.g., 3) having associated IO modules on the same sub-network, in which case the step 506 (and similarly a step 516 described below) may determine whether the set number of minimum number has been satisfied. If there is a match (or set number of minimum number of matches) determined in the step 506, then in a step 513 the node information may be recorded, for example, in one or more data structures and/or in a config. file or the like, after which the method 500 may return to the step 502. If it is determined in the step 506 that there is not a subnet match, the user may be notified of the lack of a match in a step 508. For example, a message may be displayed and/or audially played for the user indicating that there is no other node of the cluster having an IO module that belongs to a same subnet as an IO module associated with the node being added to the cluster.

In a step 510, it may be determined whether the user wants to remove or modify the node in response to receiving the notification. For example, in addition to being notified in the step 508, the user may be presented with options to remove or modify the node; e.g., to associate a different IO module with the node or change the network addresses of the ports of the IO module associated with the node to be on the same sub-network as at least one other IO module associated with a node of the cluster. The user may not want to remove or modify the node at this point for any of a variety of reasons. For example, perhaps the node is the first node being added to the cluster, or the user wants to complete adding nodes to the cluster in a first phase, and then review the nodes to determine which node(s) to remove and/or modify.

If the user decides to remove the node from the cluster or modify it, then in a step 512, the user may remove or modify the node, for example, by selecting a different IO module having a same sub-network as at least one other IO module associated with a node of the cluster or by modifying the network address of the associated IO module to be in a same sub-network as at least one other IO module associated with another node of the cluster. If the user indicates that the user does not want to modify the node in the step 510, or after performance of the step 512, the method 500 may proceed to the step 513.

If it is decided by the user in the step 502 to not add another node to the cluster, then the method 500 may provide for the review of the nodes in the cluster resulting from iterative performance of the steps 502-512, where this review may include determining whether the IO module associated with each node has a same sub-network as at least one other IO module associated with a node of the cluster. For example, if it is decided by the user to not add another node to the cluster in the step 502, then, in a step 514, a current node may be set to a next node in list of nodes defined for the cluster.

In step 516, it may be determined whether there is a subnet match between the IO module associated with the current node and an IO module associated with at least one other node of the cluster, for example, by comparing the sub-network and/or IP addresses of the IO module of the current node with sub-networks and/or IP addresses of IO modules associated with other nodes of the cluster. If there is a match, the method 500 may proceed to a step 524 in which it may be determined whether there is a next node in the cluster. If there is a next node, the method 500 may return to the step 516; otherwise, the method 500 may end.

If it is determined in the step 516 that there is not a subnet match between the IO module of the current node and an IO module of any other node in the cluster, the user may be notified of the lack of a match in a step 518. In a step 520, it may be determined whether the user wants to remove or modify the current node in response to receiving the notification. For example, in addition to being notified in the step 518, the user may be presented with an option to remove or modify the node; e.g., to change the network addresses of the ports of the IO module of the node to be on the same sub-network as an IO module of at least one other node of the cluster.

If the user indicates that the user does not want to modify the node in step 520, the method 500 may proceed to the step 524. If the user decides to remove the node from the cluster or modify it, then, in a step 522, the user may remove or modify the IO module, for example, by modifying the network address of the IO module to be in a same sub-network as at least one other IO module of the cluster. After the step 522, the method may proceed to the step 523, in which the node information may be recorded, for example, in one or more data structures and/or in a config. file or the like; after which the method 500 may proceed to the step 524.

In some embodiments, it may be required that user either remove or modify the node if it is determined in the step 516 that there is not a match, e.g., to help prevent a situation in which the node cannot be used for a file server (or another application) because the subnet of the IO module associated with the node does not match the subnet of an IO module associated any other node of the cluster. In such embodiments, the method 500 may proceed from the step 518 directly to the step 522 (not shown).

FIG. 6 is a flowchart illustrating an example of a method 600 of managing configuration of a file server, according to embodiments of the invention. Other embodiments of a method of managing configuration of a file server, for example, variations of method 600, are possible and are intended to fall within the scope of the invention.

In a step 601, a cluster may be selected by a user (e.g., IT admin, host admin, network admin and/or storage admin) for implementation of the file server. For example, a user interface may present a list of clusters and information about same, and the user interface may enable the user to select from the list. The list of clusters and information about same may be obtained from the one or more data structures and/or config. file or the like populated for each cluster during performance of the method 500 described in relation to FIG. 5.

In a step 602, a user may select a node of the selected cluster to serve as a node of a file server, for example, as a primary node of a file server. For example, the user interface may present a list of nodes of the cluster, and information about each node, and enable the user to select a primary node from the list of nodes. The list of nodes and information about same may be obtained from the one or more data structures and/or config. file or the like populated for the cluster during performance of the method 500 described in relation to FIG. 5.

In a step 604, the subnet associated with the node (e.g., primary node); i.e., the subnet of the IO module associated with the node, may be determined from the node information. Based on the associated subnet, it may be determined in the step 606 which cluster nodes are eligible to serve as failover nodes from the node selected in the step 602. For example, it may be determined which other nodes of the cluster are associated with a same subnet as the primary node; i.e., which nodes have an associated IO module on the same subnet as the IO module of the selected node. The step 606 may include comparing subnet information of nodes from the recorded node information.

In a step 608, the eligible nodes determined in the step 606 may be displayed and/or audially played to the user, and in the step 610 the selection of one or more failover nodes may be restricted to the eligible nodes displayed in 608. In a step 612, the user may select one or more of the eligible nodes.

In other embodiments, all the nodes of a cluster may be displayed in the step 608, and a user then selects one or more of the displayed nodes, and the step 610 includes determining, for each selected failover node, whether the subnet associated with the failover node matches the subnet associated with the node selected in the step 602. In such embodiments, the step 610 may reject selected failover nodes that do not have such matching nodes, may indicate the rejection to the user, and may require the user to make a different selection. In some embodiments, the user may be required to select a set number of minimum number of failover nodes, for example, at least two failover nodes, including a first backup node and a preferred node to be used in the event the first backup node fails.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 400, 500 and 600, or parts thereof, may be implemented using one or more of the systems and/or data structures described in relation to FIGS. 1-3 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of configuring an application on a storage system, comprising:
    associating a plurality of IO (input/output) modules of the storage system with a cluster of processing nodes;
    configuring the plurality of IO modules, each having at least one characteristic in common with remaining ones of the plurality of IO modules, to have a plurality of corresponding network addresses in a same first sub-network of a network;
    configuring the cluster of processing nodes, wherein said configuring the cluster includes requiring that at least a specified minimum number of processing nodes of the cluster have associated IO modules on the same first sub-network; and
    configuring the application, that is a distributed file server application, for execution on a plurality of the processing nodes of the cluster, wherein the plurality of the processing nodes executing the application is restricted to processing nodes of the cluster associated with IO modules having a network address on the same first sub-network of the network coupling the storage system to a host system, wherein said configuring the application includes:
        configuring a first of the plurality of processing nodes as a primary processing node of the distributed file server application, wherein the primary processing node is included in a first storage processing module, wherein the primary processing node is associated with a first of the plurality of IO modules that is included in the first storage processing module and that has a first network address included in the first sub-network; and
    configuring two of the plurality of processing nodes, other than the first processing node, as two failover processing nodes of the distributed file server application, wherein the two failover processing nodes are included in a second storage processing module that is different from the first storage processing module, wherein each of the first storage processing module and the second storage processing module is a separate, physically discrete component of the storage system, wherein the two failover processing nodes are associated with two of the plurality of IO modules that are included in the second storage processing module and that have corresponding network addresses included in the same first sub-network as the first network address, wherein a first of the two failover processing nodes includes a first backup node to be used upon failure of the primary processing node and a second backup node to be used upon failure of the first backup node.

2. The method of claim 1, further comprising:
    a user selecting the first processing node of the plurality of processing nodes as the primary node of the application; and
    determining the two processing nodes of the cluster that are eligible to serve as the two failover nodes for the first processing node.

3. The method of claim 2, further comprising:
    displaying at least the two processing nodes of the cluster that are eligible to serve as the two failover nodes for the first processing node.

4. The method of claim 1, further comprising:
verifying that each of the plurality of IO modules associated with the cluster share a sub-network with at least one other of the plurality of IO modules of the cluster.

5. The method of claim 4, further comprising:
notifying a user when at least one of the plurality of IO modules associated with the cluster does not share a sub-network with at least one other of the plurality of IO modules of the cluster.

6. The method of claim 1, wherein the processing nodes are virtual machines.

7. The method of claim 1, wherein each of the plurality of IO modules having corresponding network addresses in the same first sub-network includes one or more physical ports having a same.

8. A storage system comprising:
a cluster of processing nodes, wherein each of the processing nodes includes a processor; and
a memory comprising code stored therein that, when executed, performs a method of configuring an application on a storage system, comprising:
associating a plurality of IO (input/output) modules of the storage system with the cluster of processing nodes;
configuring the plurality of IO modules, each having at least one characteristic in common with remaining ones of the plurality of IO modules, to have a plurality of corresponding network addresses in a same first sub-network of a network;
configuring the cluster of processing nodes, wherein said configuring the cluster includes requiring that at least a specified minimum number of processing nodes of the cluster have associated IO modules on the same first sub-network; and
configuring the application, that is a distributed file server application, for execution on a plurality of the processing nodes of the cluster, wherein the plurality of the processing nodes executing the application is restricted to processing nodes of the cluster associated with IO modules having a network address on the same first sub-network of the network coupling the storage system to a host system, wherein said configuring the application includes:
configuring a first of the plurality of processing nodes as a primary processing node of the distributed file server application, wherein the primary processing node is included in a first storage processing module, wherein the primary processing node is associated with a first of the plurality of IO modules that is included in the first storage processing module and that has a first network address included in the first sub-network; and
configuring two of the plurality of processing nodes, other than the first processing node, as two failover processing nodes of the distributed file server application, wherein the two failover processing nodes are included in a second storage processing module that is different from the first storage processing module, wherein each of the first storage processing module and the second storage processing module is a separate, physically discrete component of the storage system, wherein the two failover processing nodes are associated with two of the plurality of IO modules that are included in the second storage processing module and that have corresponding network addresses included in the same first sub-network as the first network address, wherein a first of the two failover processing nodes includes a first backup node to be used upon failure of the primary processing node and a second backup node to be used upon failure of the first backup node.

9. The storage system of claim 8, wherein the method further comprises:
a user selecting the first processing node of the plurality of processing nodes as the primary node of the application; and
determining the two processing nodes of the cluster that are eligible to serve as the two failover nodes for the first processing node.

10. The storage system of claim 9, wherein the method further comprises:
displaying at least the two processing nodes of the cluster that are eligible to serve as the two failover nodes for the first processing node.

11. The storage system of claim 8, wherein the method further comprises:
verifying that each of the plurality of IO modules associated with the cluster share a sub-network with at least one other of the plurality of IO modules of the cluster.

12. The storage system of claim 11, wherein the method further comprises:
notifying a user when at least one of the plurality of IO modules associated with the cluster does not share a sub-network with at least one other of the plurality of IO modules of the cluster.

13. The storage system of claim 8, wherein the processing nodes each comprise a virtual machine.

14. Non-transitory computer-readable media having code stored thereon that, when executed, performs a method of configuring an application on a storage system comprising:
associating a plurality of IO (input/output) modules of the storage system with a cluster of processing nodes;
configuring the plurality of IO modules, each having at least one characteristic in common with remaining ones of the plurality of IO modules, to have a plurality of corresponding network addresses in a same first sub-network of a network;
configuring the cluster of processing nodes, wherein said configuring the cluster includes requiring that at least a specified minimum number of processing nodes of the cluster have associated IO modules on the same first sub-network; and
configuring the application, that is a distributed file server application, for execution on a plurality of the processing nodes of the cluster, wherein the plurality of the processing nodes executing the application is restricted to processing nodes of the cluster associated with IO modules having a network address on the same first sub-network of the network coupling the storage system to a host system, wherein said configuring the application includes:
configuring a first of the plurality of processing nodes as a primary processing node of the distributed file server application, wherein the primary processing node is included in a first storage processing module, wherein the primary processing node is associated with a first of the plurality of IO modules that is included in the first storage processing module and that has a first network address included in the first sub-network; and
configuring two of the plurality of processing nodes, other than the first processing node, as two failover processing nodes of the distributed file server application, wherein the two failover processing nodes are included in a second storage processing module that is different from the first storage processing module, wherein each of the first storage processing module and the second storage processing module is a separate, physically discrete component of the storage system, wherein the two failover processing nodes are associated with two of the plurality of IO modules that are included in the second storage processing module and that have corresponding network addresses included in the same first sub-network as the first network address, wherein a first of the two failover processing nodes includes a first backup node to be used upon failure of the primary processing node and a second backup node to be used upon failure of the first backup node.

* * * * *

UNITED STATES PATENT AND TRADEMARK OFFICE
CERTIFICATE OF CORRECTION

| | | |
|---|---|---|
| PATENT NO. | : 11,977,510 B2 | Page 1 of 1 |
| APPLICATION NO. | : 16/925678 | |
| DATED | : May 7, 2024 | |
| INVENTOR(S) | : Singhal et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 638 days.

Signed and Sealed this
Twelfth Day of August, 2025

Coke Morgan Stewart
*Acting Director of the United States Patent and Trademark Office*